Figures 1, 2:
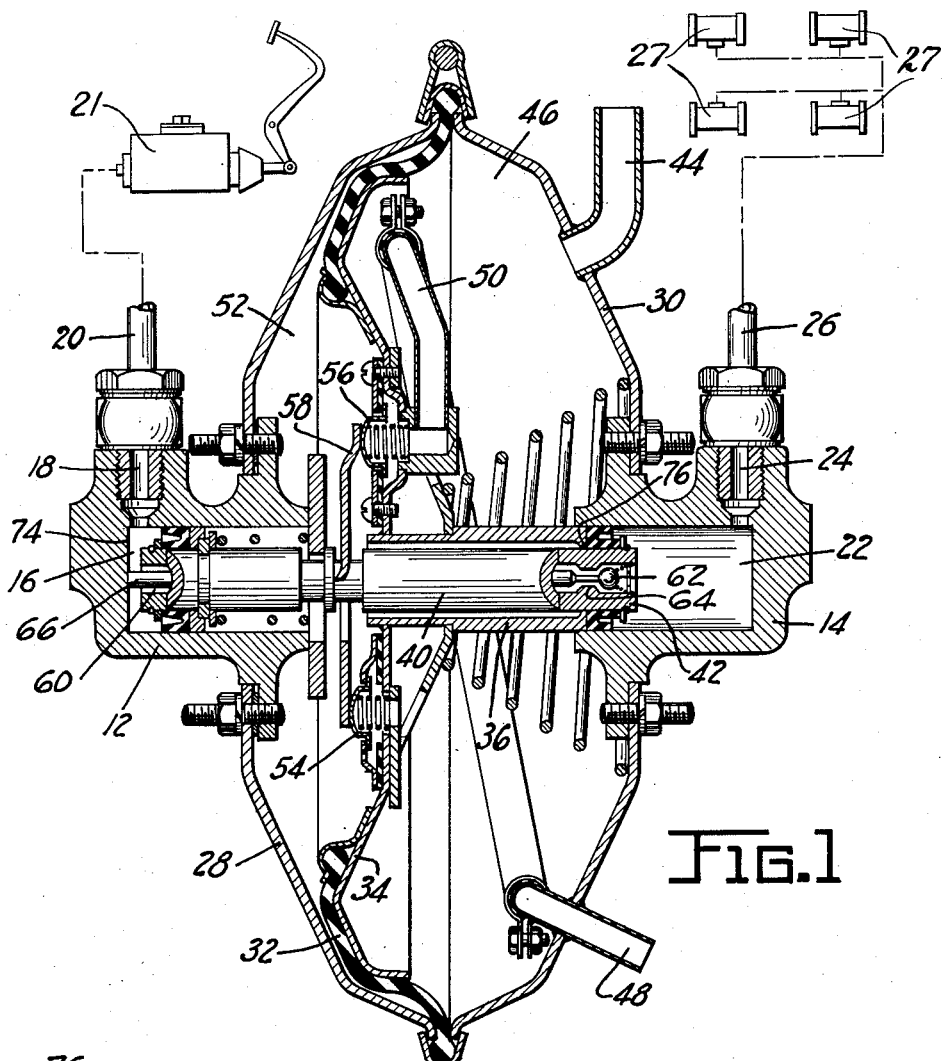

Sept. 28, 1948.  E. R. PRICE  2,450,160
PRESSURE FLUID OPERATED PRESSURE INTENSIFIER
Filed April 19, 1944

INVENTOR
EARL R. PRICE
BY T. J. Plante
ATTORNEY

Patented Sept. 28, 1948

2,450,160

UNITED STATES PATENT OFFICE 2,450,160

PRESSURE FLUID OPERATED PRESSURE INTENSIFIER

Earl R. Price, South Bend, Ind., assignor to Bendix Aviation Corporation, South Bend, Ind., a corporation of Delaware Application April 19, 1944, Serial No. 531,721

3 Claims. (Cl. 60—54.5)

This invention relates to a pressure fluid operated pressure intensifier which is operated conjointly by manually created pressure and power created pressure. More particularly, it relates to a booster for a hydraulic pressure system having a master cylinder and a motor, said booster being interposed in the connecting lines between said master cylinder and motor and comprising a differential air pressure power device and a second master cylinder which is adapted to build pressure in the motor and which itself is operated conjointly by the pressure of the differential air pressure power device and by the manually created pressure of the hydraulic liquid in the first master cylinder.

A recently proposed booster device incorporating the features mentioned in the preceding paragraph is characterized by the provision of coaxial relatively movable piston or plunger members in the aforesaid second master cylinder. In this arrangement an annular plunger is driven by the differential air pressure power device, while a second plunger has a portion extending inside the annular plunger just referred to and a portion at the rear which is subjected to the pressure of the manually operated master cylinder. The pressure of the latter plunger, which is subjected to manually created pressure, aids the annular plunger in creating pressure in the motor, and control of the differential air pressure power device is accomplished by relative axial movements of the two plungers.

The device discussed in the preceding paragraph, in its present form, has several operating defects which must be remedied in order to provide a practical device. One of these defects is the tendency of the plungers or pistons to bind or stick in applied position, making it impossible to release the pressure in the motor. If this motor is operating brakes as contemplated, inability to release the pressure is a serious matter. A second important defect of this device is its occasional failure to obtain any power from the differential air pressure power device, due to its occasionally moving to full displacement without obtaining any greater pressure than that produced manually, even though the power device is fully operative. The latter trouble usually occurs on a slow application of pressure to the system.

The primary object of the present invention is to remedy the aforementioned defects in boosters of the type under discussion.

A second and related object is to remedy said defects without adding substantially to the complexity or expensiveness of the booster.

Other objects and advantages of the present invention will become apparent during the course of the following description, reference being had therein to the accompanying drawing, in which:

Figure 1 is a vertical sectional view taken through a fluid pressure booster incorporating my invention; and Figure 2 is a closeup of a portion of the fluid pressure booster of Figure 1.

Referring to the drawing, it shows the combination of a power device, a control for the power device and a master cylinder operated by the power device. The master cylinder of the power unit or booster comprises two aligned coaxial portions 12 and 14. The portion 12 has a cylindrical bore 16 which communicates through a port 18 with a conduit 20 leading to a manually operable conventional master cylinder 21. The portion 14 has a cylindrical bore 22 which communicates by means of a port 24 with conduit 26 leading to the motor or motors which are to be operated, such as the wheel cylinders 27 of a hydraulically applied brake. The portion 12 of the master cylinder is mounted on a shell 28 constituting one side of a differential air pressure power device. The portion 14 of the master cylinder is mounted on a shell 30 constituting the other side of the differential air pressure power device. Clamped between the shells 28 and 30 is an annular flexible diaphragm 32 which is retained at its inner end in a piston 34, the piston being directly mechanically connected with an annular plunger 36 to drive the same into the bore 22 to create brake applying pressure. The pressure created in the manually operated conventional master cylinder acts against the enlarged left end 38 of the piston 40 which extends through the differential air pressure power device and has a forward or head portion 42 inside the annular plunger 36 and acting in the bore 22 of the master cylinder. The pressure created in bore 22 thus results from the combined pressure of the piston 34 and the hydraulic pressure acting against the portion 38 of piston 40. The operator is apprised of the amount of power-created pressure in chamber 22 by the reaction of that pressure against the forward end 42 of piston 40, the ratio of reaction to total brake applying pressure being equal to the ratio of areas of the smaller forward end 42 of piston 40' to the larger rearward end 38 of the same piston.

Operation of the differential air pressure power device is controlled by valves, which are in turn controlled by relative movements of piston 40 and plunger 36. A relatively low pressure source, such as the intake manifold of an automobile, is connected by means of pipe 44 to chamber 46 of the power device, which is formed between the piston 34 and shell 30. A relatively high pressure source, such as the atmosphere, or compressed air, is connected by means of pipe 48 to a flexible tube 50 which is supported by the floats with the diaphragm and piston assembly 32—34. The operation of the power device depends upon the pressure in chamber 52, which is between piston 34 and shell 28. Two valve elements are adapted to control the pressure in chamber 52. One of these valve elements, indicated at 54, controls the communication of chamber 52 with the low pressure source, while the other valve element, indicated at 56, controls the communication of chamber 52 with the high pressure source. A floating valve actuating member 58 is adapted to be moved by piston 40 to operate the valve elements 54 and 56.

In order that the hydraulic fluid in chamber 22 and in the motors which are connected thereto may be in direct communication with hydraulic fluid in chamber 16 and in the manually operable master cylinder so long as the brakes are released, thus providing that compensation for changes in the volume of the hydraulic fluid may be accomplished by means of a single reservoir which is provided as a part of the conventional master cylinder 21, a passage 60 extends longitudinally through piston 40. Since fluid communication between chambers 16 and 22 must be cut off during brake application, a check valve 62 is adapted to seat against flange 64 inside passage 60 to cut off the flow of liquid from chamber 16 to 22 as soon as piston 40 has moved to the right sufficiently for the rod 66, which holds valve 62 away from flange 64 when piston 40 is in its retracted position, to permit valve 62 to seat.

During the applying stroke of piston 40 and plunger 36, it is necessary that the valve member 62 move to closed position and cut off communication between chambers 16 and 22.

Heretofore the pressure of fluid in chamber 22 has been relied on to move valve member 62 to its seat after the pressure stroke of piston 40 has begun. This may have the purpose of permitting a relatively large flow of fluid from chamber 16 to chamber 22 before the displacement of the limited amount of fluid in chamber 22 begins. However, it has been found that, during certain brake applications, particularly those wherein the brake applying pressure is gradually augmented, chambers 16 and 22 remain in communication throughout the full pressure stroke, and therefore the entire brake applying pressure is built up manually, the power device being incapable of adding any pressure to ease the operator's effort.

I propose to prevent occurrences of this kind by providing suitable means for positively insuring that communication will be cut off between chambers 16 and 22, almost immediately upon the application of pressure by the operator to the manually operated master cylinder.

A positively acting resilient member such as the spring 68 is compressed between the ball valve member 62 and a shoulder 70 provided in the front end of passage 60 by a ring which may be held in position by a C spring 72 snapped into a groove in the inner forward end of the piston. The exact structure may be varied somewhat but it is necessary that positive means be used for moving the valve 62 to its seat immediately upon release of the valve by the rod 66 due to the movement of piston 40 away from the rear wall 74 of portion 12 of the power operated master cylinder.

The valve 62 may also be made positive in action by positioning the cylinder on a vertical axis with the valve 62 above the piston 40.

Because the portions 12 and 14 of the master cylinder are formed as separate units and separately mounted, manufacturing tolerances throughout the construction of the master cylinder itself and of the power device almost invariably result in a slight misalignment of the bores 16 and 22. This misalignment results in binding of piston 40 in chamber 16, of plunger 36 in chamber 22, and particularly of the forward end 42 of piston 40 against the annular plunger 36. With forward or pressure applying movement of the piston 40 in plunger 36 the binding therebetween increases, since the effect of misalignment of the bores is a gradual increase in the original eccentricity as the plunger and piston move forward in the applying stroke.

The possibility of binding between piston 40 and plunger 36 is particularly important since it disturbs the action of the valve means which control the power device. The binding is greatest at the end of the stroke, and consequently it tends to prevent the valve from releasing and to hold the brakes in applied position, regardless of the efforts of the operator to release them.

In order to prevent binding between the piston 40 and plunger 36, relative movement of which is relied upon to control the valves 54 and 56, I limit the bearing surface between piston 40 and plunger 36 to the small surface 76 provided at the forward end of plunger 36. This bearing is in effect a pivotal bearing which permits the plunger 36 to move somewhat out of line with piston 40 as they both move forward into chamber 22, without exerting an appreciable binding force tending to prevent movement of piston 40 relative to plunger 36. I thus insure that the valve which controls the power device will be fully controllable at all times, and that the binding force will never be sufficient to prevent release of the power and release of the brakes.

Although a particular embodiment of my invention has been described, it will be understood by those skilled in the art that the objects of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A device, for applying a combined power and manually created pressure to a hydraulic pressure system, having coaxial bores at opposite sides thereof, one connected to a manually operable hydraulic master cylinder and the other connected to a hydraulic motor, an annular plunger reciprocable in the motor-connected-bore, a power-operated booster element operatively associated with the annular plunger to drive the same to build pressure in the motor, a stepped piston having a small diameter portion reciprocable in the annular plunger and a larger diameter portion reciprocable in the master-cylinder-connected-bore, the piston and plunger being in pivotal bearing relationship with one another whereby relative angular movement of the piston and plunger is permitted in order to prevent binding, said stepped piston having a passage therethrough interconnecting the coaxial bores, a valve adapted to seat and thereby close the passage during the pressure stroke of the plunger and piston, means for holding the valve unseated when the piston is in retracted position, a retaining member in the forward end of the piston, and a spring compressed between the valve and the retaining member for exerting a slight force tending to seat the valve.

2. A device, for applying a combined power and manually created pressure to a hydraulic pressure system, having coaxial bores at opposite sides thereof, one connected to a manually operable hydraulic master cylinder and the other connected to a hydraulic motor, an annular plunger reciprocable in the motor-connected-bore, a power-operated booster element operatively associated with the annular plunger to drive the same to build pressure in the motor, a stepped piston having a small diameter portion reciprocable in the annular plunger and a large diameter portion reciprocable in the master-cylinder-connected-bore, the piston and plunger being in pivotal bearing relationship with one another whereby relative angular movement of the piston and plunger is permitted in order to prevent binding, said stepped piston having a passage therethrough interconnecting the coaxial bores, a valve adapted to seat and thereby close the passage during the pressure stroke of the plunger and piston, and means for holding the valve unseated when the piston is in retracted position.

3. A device, for applying a combined power and manually created pressure to a hydraulic pressure system, having coaxial bores at opposite sides thereof, one connected to a manually operable hydraulic master cylinder and the other connected to a hydraulic motor, an annular plunger reciprocable in the motor-connected-bore, a power-operated booster element operatively associated with the annular plunger to drive the same to build pressure in the motor, and a stepped piston having a small diameter portion extending through the annular plunger into the motor-connected-bore and a large diameter portion reciprocable in the master-cylinder-connected-bore, the small diameter end of the piston being supported by bearing contact with the plunger only at the forward end of said plunger, thereby permitting angular pivotal movement of the piston and plunger with respect to one another during their pressure stroke.

EARL R. PRICE.

REFERENCES CITED

The following references are of record in the file of this patent:

UNITED STATES PATENTS

| Number | Name | Date |
| --- | --- | --- |
| 2,260,490 | Stelzer | Oct. 28, 1941 |
| 2,260,491 | Stelzer | Oct. 28, 1941 |
| 2,275,697 | Stelzer | Mar. 10, 1942 |
| 2,359,687 | Stelzer | Oct. 3, 1944 |
| 2,374,545 | Ingres | Apr. 24, 1945 |
| 2,377,699 | Klimkiewicz | June 5, 1945 |

OTHER REFERENCES

Commercial Car Journal, Sept. 1943, page 64, (published by Chilton Co., Philadelphia, Pa.).